Jan. 21, 1958   E. V. PAOLICELLI   2,820,879
BURN-IN KNIFE HEATER
Filed Sept. 10, 1956   2 Sheets-Sheet 1
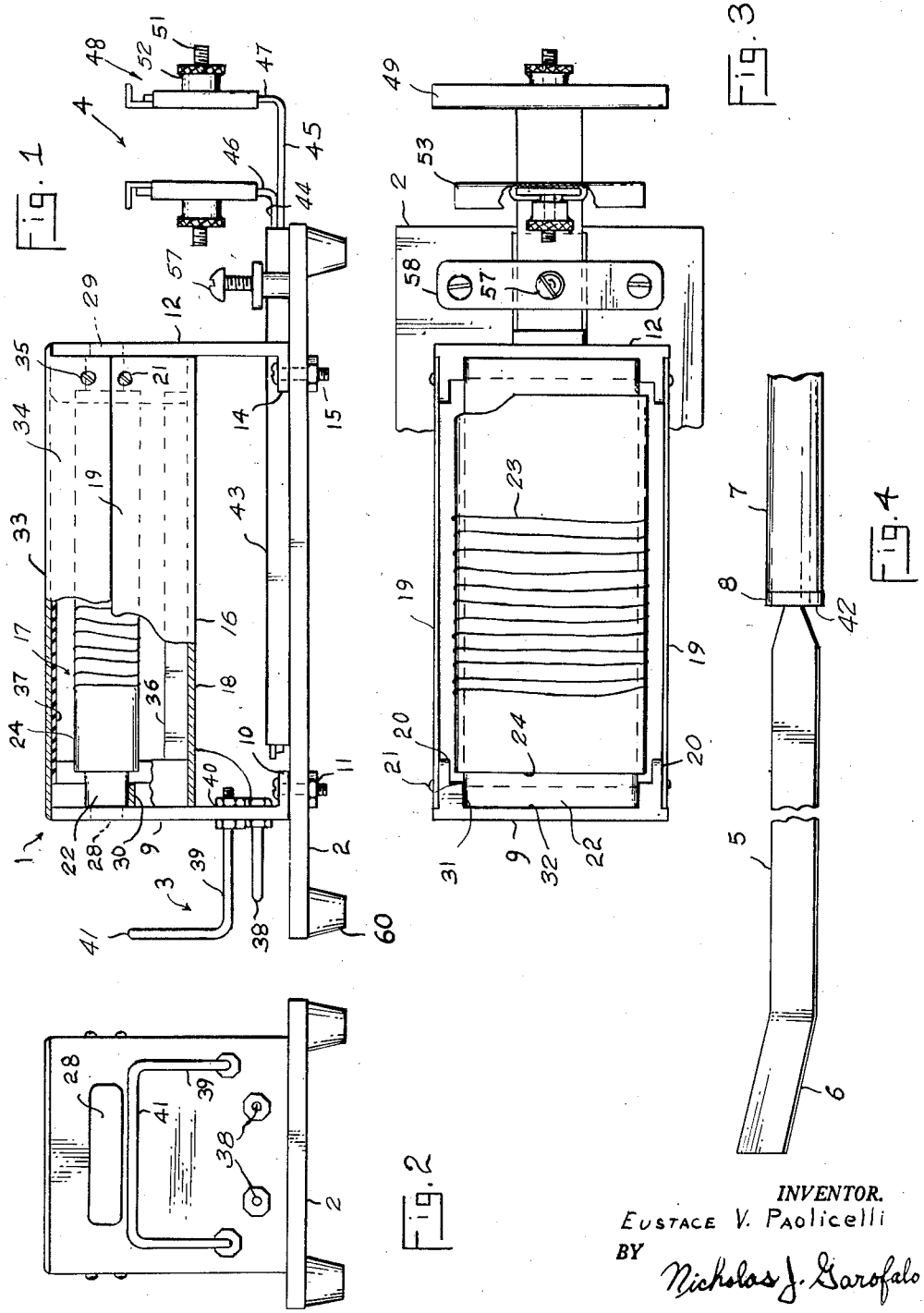
INVENTOR.
EUSTACE V. Paolicelli
BY Nicholas J. Garofalo
Attorney Jan. 21, 1958

E. V. PAOLICELLI 2,820,879

BURN-IN KNIFE HEATER

Filed Sept. 10, 1956

INVENTOR.
EUSTACE V. Paolicelli

BY Nicholas J. Garofalo

Attorney

United States Patent Office 2,820,879
Patented Jan. 21, 1958

2,820,879

BURN-IN KNIFE HEATER

Eustace V. Paolicelli, Elmhurst, N. Y.

Application September 10, 1956, Serial No. 608,834

9 Claims. (Cl. 219—35)

This invention pertains to new and useful improvements in tool heating devices. More particularly, it is concerned with a heating device or oven which, though subject to wide industrial application, finds special use as a heater for burn-in knives.

Burn-in knives are used in the furniture industry in effecting the repair or concealment of scratches, dents and the like in finished furniture. In general, this process involves heating the knife in an oven to a desired temperature. The heated knife is used in melting a suitable substance, such as a shellac stick, to fill and smooth over the defect. The affected surface is then finished in suitable manner. A knife that is too cold will not properly melt the shellac; a knife that is too hot will bubble the shellac, and will cause possible burning of the furniture surface to which it is applied. During a day's work a burn-in knife will be heated many times and, because of a lack of practical means for predetermining the heat to which the knife will be heated, the knife will have a different degree of heat each time it is removed from the heating apparatus used.

To eliminate guesswork in the heating of a burn-in knife, to save time and labor otherwise lost because of insufficient or excessive heating of the knife, and to provide best results in the repair work to be done, a general object of this invention is to provide a burn-in knife heating oven wherein guesswork in the heating of a burn-in knife is eliminated.

A further object of the invention is to provide an improved and practical oven for heating burn-in knives, which is efficient in operation for the use intended, is simple and compact in structure, has a minimum of parts, and is, accordingly, economical to manufacture.

Another object of the invention is to provide regulatory means whereby the extent, to which a burn-in knife is to be inserted into the oven to acquire a desired degree of heat, may be predetermined.

A feature of the oven of the present invention lies in certain adjustable means whereby the oven may accommodate burn-in knives of various blade and handle sizes, and whereby the extent, to which the particular knife is to be inserted into the oven to acquire a desired degree of heat, may be regulated and predetermined.

A further feature of the invention lies in a certain arrangement of elements whereby the oven can accommodate a plurality of burn-in knives at the same time, so that some of the knives will acquire a hot degree of heat and others will acquare a predetermined lesser degree of heat.

The invention further lies in the particular construction and general organization of its parts as well as in their cooperative association with one another to effect the results intended herein.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

Fig. 1 is a side elevational view with parts cut away to give a view to the interior of a burn-in knife heater embodying my invention;

Fig. 2 is a left end view thereof;

Fig. 3 is a top plan view with the cover removed;

Fig. 4 is a view of a conventional burn-in knife;

Figure 7:
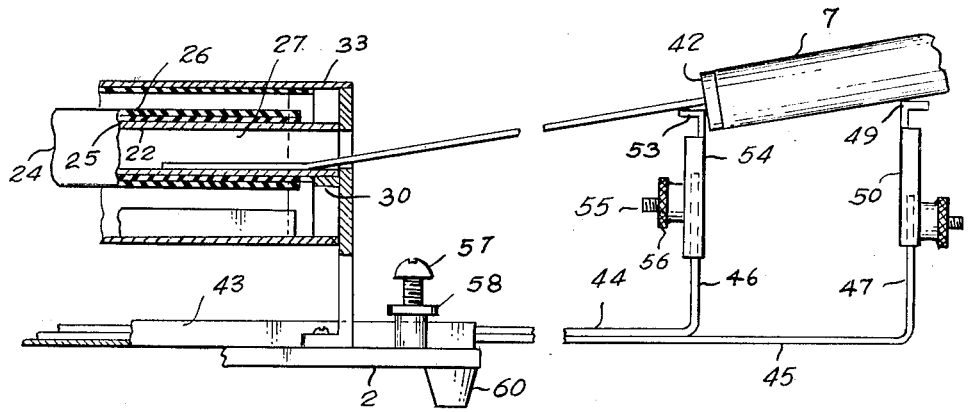
Fig. 7 is a longitudinal section through the right end of the heater and showing the manner of supporting a burn-in knife in this end of the heater.
Figure 5:
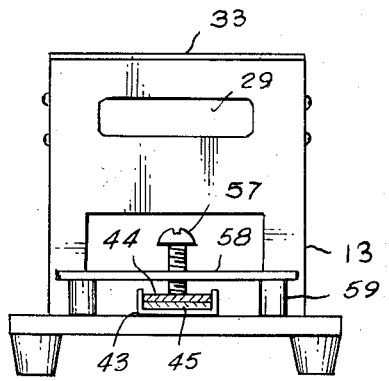
Fig. 5 is a right end view.
Figure 6:
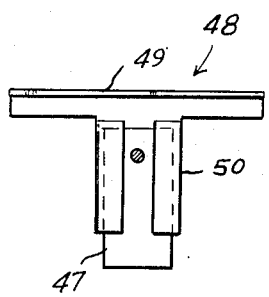
Fig. 6 is a detail of the handle rest.

In describing the invention in further detail, reference is directed to the several drawings wherein there is shown an open ended electric oven member 1, mounted upon a base board 2, and provided with means 3 and 4 for supporting conventional burn-in knives in opposite ends of the oven. A conventional burn-in knife or spatula, shown in Fig. 4, is characterized by an elongated flat blade 5 which is offset at one end to provide a thin flat work portion 6 and is fitted at the other end with a shouldered wooden handle 7. A metal band 8 is provided at one end of the handle as a protection against burning of the handle.

The oven member includes an upright wall 9 at its left end, which is fastened by foot lugs 10 and fastening means 11 to the base board. At the opposite end, the oven includes an upright wall 12 having depending laterally spaced legs 13 retained by foot lugs 14 and fastening means 15 to the base board. The end walls 9 and 12 support between them a horizontally disposed elongated shallow shell 16. The latter serves as a container for an electric heating coil assembly 17. The shell comprises a bottom wall 18 and side walls 19. The open ends of the shell abut the marginal edges of the opposed end walls 9 and 12; the marginal end portions of the side walls of the shell abut adjacent lower portions of ears 20. The latter are integral with and extend inwardly from the end walls 9 and 12. Screws 21 passed through the side walls of the shell and threadedly engaged in the ears hold the shell in a position wherein it is disposed in spaced relation to the base board 2 below.

The heating coil assembly 17 comprises an open ended metal tubular structure or member 22 which is rectangular in cross section. Wound about the central area of the tubular member is an electric heating coil or element 23 which is protected from short circuiting contact with the former by suitable insulating means 24. The latter may include a layer of electric insulating material such as mica sheeting 25, as well as a layer of heat retarding material such as the asbestos sheeting 26. The latter guards against the transmission of excessive heat from the coil to the tubular member.

The interior 27 of the tubular member serves as an oven into the open ends of which conventional burn-in knives may be inserted. The tubular member is horizontally disposed in the shell 16 in fixed spaced relation to the side and bottom walls of the latter, whereby the heating coil is protected from short circuiting contact with the walls of the shell.

The end openings of the tubular oven are in register with complementary openings 28, 29 formed through the end walls 9 and 12. The opening 28, 29, as well as the end openings of the tubular oven are of narrow height, and have a width sufficient to accommodate in side by side relation more than one burn-in knife, preferably at least two. The height of the oven openings is sufficient to freely accommodate the blades of the knives therein.

The ends of the tubular member project beyond the coil winding and a little beyond the insulating material 24, so that the marginal end portions of the bottom wall of the tubular member rest upon shoulders 30 formed along the lower inner edges of the end wall openings 28 and 29. The tubular member is restrained against side play by abutting side walls 31 of vertical channels 32 formed between the ears 20 of the end walls 9 and 12. The channels 32 open out at the top. By this arrangement, the heating coil assembly 16 may be readily removed in a vertical direction from the channels for repairs or replacement. In addition, the channels 32 and the shoulders 30 serve as means for guiding the heating coil assembly into its proper position wherein the end openings of the tubular member register with the end wall openings 28 and 29, and the assembly is held in proper spaced relation to the walls of the shell.

A removable cover 33 is provided to seal over the open top of the shell container 16. The cover has depending side walls 34 the marginal end portions of which are adapted to abut against the outside of the upper portions of the ears 20. Screw means 35 serve to hold the cover fast to the latter in a position wherein the top and side walls of the cover are properly spaced from contact with the heating coil. A block of insulating material 36 rests upon the floor of the shell. Further insulating material may be used to line the underside of the cover, as at 37.

The terminal ends of the heating coil pass through insulated holes, not shown, in the bottom wall of shell 16, and are connected to prongs 38 extending from the outer face of the lower portion of the end wall 9. The mounted ends of the prongs are electrically insulated from the end wall in conventional manner. The prongs are adapted to be received in the receptacle of an electric supply cord.

The heating element 23 is spread over the central area of the oven assembly. Accordingly, the oven, when heated, is hottest in its central area. The heat of the oven tapers off toward the open ends thereof. Hence, it is clear that the degree to which the work end of a burn-in knife will be heated, will be relative to its location in the oven with respect to the central or hottest region of the latter. The nearer to the center of the oven the work end of the knife is located, the hotter it will become; and the closer it is to an open end of the oven, the lesser will be its heat. The supporting means 3 and 4 at the opposite ends of the oven serve to not only support the handle of a burn-in knife, but also serve by their location to predetermine the degree to which the work end of the knife will be heated.

The burn-in knife supporting means 3 extends outwardly from the outer face of the left end wall 9. This support includes a pair of horizontally disposed arms 39 which are fixed to the end wall, as by the opposed nut means 40. The outer ends of the arms 39 bend upwardly at right angles to form a common bridge portion 41 disposed in opposed relation to the oven opening 28. This bridge serves as a fixed rest for the handle of a burn-in knife the blade of which has been inserted into the opposed oven opening. The blade end of the knife may be inserted into the oven until the annular shoulder 42 of the handle limits against the end wall 9, the diameter of the shoulder being greater than the height of the oven opening. This will bring the work end of the blade of a knife of conventional length into the central area of the oven and, as a consequence a hot work end will result. To obtain a blade having a lesser degree of heat is a matter of guesswork when using this end of the oven in locating the end of the blade between the open end and the central area of the oven. It is also a matter of guesswork in locating the end of the blade in the central area of the oven when the blade of the knife is longer than the conventional length. However, a knife inserted in this end of the oven is usually intended as a spare to be used when the particular need arises. When this end 28 of the oven is used, a conventional length knife is preferably used and is fully extended into the oven until the shoulder of the handle limits against the end wall 9. This will provide a hot knife ready for use when the occasion for a hot knife arises.

The burn-in knife supporting means 4 at the right end of the oven also serves to support the protruding handle of a knife the work end of which has been inserted into the corresponding end 29 of the oven. This supporting means is, however, adjustable for selectively limiting the extent to which the blade of a knife may be inserted into the oven, whereby guesswork in heating the knife to a desired degree is eliminated.

This adjustable supporting means 4 includes a tubular guide or channel member 43 fastened in any suitable manner to the base board 2 below the center line of the tubular oven member 22. Slidable in this channel member is a pair of bars 44 and 45, one underlying the other and of similar structure. The outer or external ends of the bars extend through legs 13 of end wall 12. Beyond the latter they bend upwardly to form a pair of upright portions 46 and 47, one disposed rearwardly of the other.

Mounted on the upright end 47 is a burn-in knife handle rest 48. The latter comprises a cross arm 49 disposed in parallel relation to the opposed oven end opening 29. Depending from the center of arm 49 is a jacket or stem 50 which slidably sleeves over the free end of upright 47. When a knife blade is inserted into the oven opening 29 the cross arm 49 serves as a rest for the protruding handle.

To obtain the best heating relation of the knife with the oven, it is desired that the offset work end 6 of the blade will rest flat upon the oven floor, as in Fig. 7. To insure this, the sleeve or jacket 50 of the handle rest may be adjustably raised or lowered as required to effect the proper positioning of the blade end upon the oven floor. A set screw 51 fixed in the upright 47 and a nut 52 thereon serve to set the adjusted position of the handle rest. The bar member 45 is slidable in or out of the channel so as to insure that the handle rest will always be in a position properly underlying the knife handle, regardless of the extent to which the blade of the knife may be inserted into the oven.

Since burn-in knives may vary in blade length as well as in handle size, it is possible by this adjustable feature of the handle rest to accommodate knives having handles of different thicknesses and blades fo various lengths.

During a day's work a burn-in knife may be inserted into the oven many times. Where several repair jobs of the same character are to be executed, it may be desired that each time the burn-in knife is inserted into the oven it will be located in a specific area and thereby have a predetermined desired degree of heat each time it is withdrawn. This is of advantage in saving time, in doing good work, in avoiding overheating of the knife, and in preventing possible scorching of the object being repaired. To enable this, means is provided to selectively control the extent to which the work end of the knife is to be inserted into the oven. To this end, there is mounted on the upright 46 of slide bar 44 a burn-in knife stop member 52. The latter includes a cross arm 53 disposed in parallel relation to the cross arm 49 of the handle rest. Depending from the center of cross arm 53 is a stem or jacket 54 which slidably sleeves over the free end of the upright 46. The cross arm 53 serves as a stop against which the shoulder 42 of the handle of a knife is adapted to limit so as to curb further extension of the knife into the oven.

When the handle of a knife is resting in a selected position on the handle rest, the flat blade shank is intended to rest upon the cross arm 53 of the stop member and the shoulder of the knife handle is intended to limit against the side of this cross arm. To maintain the proper angular disposition of the knife as determined by the position of the handle rest so that the offset end of the knife will continue to rest upon the floor of the oven, the stop member 53 may be raised or lowered as needed to support the shank of the knife. This is done by adjusting the position of the stop sleeve 54 on the upright 46. A set screw 55 fixed in the upright 46 and a nut 56 threaded on the screw serve to fix the adjusted position of the stop sleeve. It is also clear, that the stop slide bar 44 may be moved further into or out of the channel member 43, so as to limit as desired the extent to which the knife may be inserted into the oven.

A set screw 57 is utilized to simultaneously fix the adjusted positions of both slide bars 44 and 45. The set screw is threadable through a member 58 which crosses above the slide bars and is mounted at its ends upon a pair of posts 59 fixed to the base board 2. Pressure of the set screw upon the upper slide bar 44 also acts upon the underlying bar so as to fix the position of both.

The base board 2 is formed of suitable heat insulating material, which may be asbestos board. Fitted to the underside of the base board at the corners are short legs 60. The legs may be of rubber, as here, to prevent sliding of the device, should it rest upon a slightly inclined surface.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described but also in all such forms and modifications as may reasonably be construed to fall within the spirit of the invention and the scope of the appended claims.

What is claimed is:

1. A burn-in knife heating device comprising an elongated horizontally disposed oven, open in one end for the reception of the blade of a burn-in knife having a shouldered handle, heating means associated with the oven for transmitting heat thereto, a base board disposed below the oven and in parallel relation thereto, upright members on the base board supporting the oven, a pair of elongated slide members supported on the base board below the oven for longitudinal adjustable slidable movement in a direction beyond the open end of the oven, a handle rest having a vertical support on one of the slide members for supporting the handle of a burn-in knife the blade of which is to be inserted into the open of the oven, and a stop member having a vertical support on the other slide member disposed between the handle rest and the open end of the oven, the stop member serving as a rest for the knife blade adjacent the handle and serving as an abutment against which the shoulder of the handle is adapted to limit when the knife blade is inserted a predetermined distance into the oven.

2. A device according to claim 1, wherein means common to both elongated members is provided for simultaneously fixing the moved position of both slide members.

3. A device according to claim 1, wherein the vertical supports of both the handle rest and the stop member are vertically adjustable so as to position the knife at a desired angular position relative to the oven opening.

4. A burn-in knife heating device including an elongated horizontally disposed electric oven open in one end for the reception of the blade of a burn-in knife having a shouldered handle, electric heating element means associated with the oven for transmitting heat thereto, a base board disposed below the oven and in parallel relation thereto, and a pair of upright members fixed to the base board and supporting the oven, characterized by a channel member fixed to the surface of the base board, a pair of elongated bars, one underlying the other and slidably disposed in the channel member, the bars each having a free end extending through one of the upright members beyond the open end of the oven, the free end of one bar extending beyond the other, a burn-in knife handle supporting means carried by the further extending bar, and means carried by the free end of the other bar for supporting the blade of the knife adjacent the shoulder of the handle and for serving as an abutment against which the shoulder of the handle is adapted to limit when the blade of the knife is inserted into the open end of the oven.

5. A device according to claim 4, wherein the elongated bars are slidable so as to extend their free ends to a plurality of desired positions beyond the open end of the oven.

6. A device according to claim 5 wherein settable means common to both slide members is provided to fix their positions so as to prevent further slidable movement therefrom.

7. A device according to claim 6 wherein the settable means comprises a cross bar supported on the base board and having a fixed position above the slide bars, and screw means in the cross bar threadable into binding engagement with the uppermost slide bar in such manner that the underlying slide bar is also bound by pressure exerted on the upper bar.

8. A device according to claim 4, wherein the handle supporting means comprises an upturned end of the free end of the underlying slide bar, a sleeve vertically adjustable thereon, and a cross arm on the sleeve for supporting the handle.

9. A device according to claim 4, wherein the blade supporting means comprises an upturned end of the free end of the upper slide bar, a sleeve vertically adjustable thereon, and a cross arm on the sleeve for supporting the blade of the knife and serving as an abutment to the shoulder of the handle.

References Cited in the file of this patent

UNITED STATES PATENTS

| | | |
|---|---|---|
| 1,354,065 | Pruessing | Sept. 28, 1920 |
| 1,481,065 | Opperman | Jan. 15, 1924 |
| 1,616,544 | Paolicelli et al. | Feb. 8, 1927 |
| 2,724,765 | Braxter | Nov. 22, 1955 |